US012592852B2

(12) United States Patent
Zhou et al.

(10) Patent No.: US 12,592,852 B2
(45) Date of Patent: Mar. 31, 2026

(54) METHOD, APPARATUS, AND SYSTEM FOR SENDING PACKET AND RECEIVING PACKET TO PERFORM OAM

(71) Applicant: Huawei Technologies Co., Ltd., Shenzhen (CN)

(72) Inventors: Tianran Zhou, Beijing (CN); Min Liu, Shenzhen (CN); Yuezhong Song, Beijing (CN); Zhenbin Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 751 days.

(21) Appl. No.: 17/743,915

(22) Filed: May 13, 2022

(65) Prior Publication Data

US 2022/0278904 A1 Sep. 1, 2022

Related U.S. Application Data

(63) Continuation of application No. PCT/CN2020/117246, filed on Sep. 23, 2020.

(30) Foreign Application Priority Data

Nov. 14, 2019 (CN) .......................... 201911115441.5

(51) Int. Cl.
H04L 41/04 (2022.01)
H04L 41/0894 (2022.01)
(Continued)

(52) U.S. Cl.
CPC .......... H04L 41/04 (2013.01); H04L 41/0894 (2022.05); H04L 41/0895 (2022.05); H04L 41/34 (2022.05)

(58) Field of Classification Search
CPC . H04L 41/12; H04L 41/0894; H04L 41/0895; H04L 41/34; H04L 41/04; H04L 41/0893
See application file for complete search history.

(56) References Cited

U.S. PATENT DOCUMENTS 10,063,447 B2 8/2018 Pignataro et al.
2005/0276227 A1 12/2005 Gunther et al.
(Continued)

FOREIGN PATENT DOCUMENTS

CA 2715472 A1 3/2011
CN 1703013 A 11/2005
(Continued)

OTHER PUBLICATIONS

M. Koldychev, et al., "PCEP extension to support Segment Routing Policy Candidate Paths," draft-barth-pce-segment-routing-policy-cp-03, Jul. 2, 2019, 21 pages.
(Continued)

*Primary Examiner* — Redentor Pasia
(74) *Attorney, Agent, or Firm* — Conley Rose, P.C.

(57) ABSTRACT

A method to perform operations, administrative, and maintenance (OAM) includes a controller generating a policy configuration packet, where the policy configuration packet includes OAM configuration information and information about a first path, and the information about the first path is used to identify the first path. The controller sends the policy configuration packet to a head node of the first path, where the policy configuration packet is used to indicate the head node to perform OAM on the first path based on the OAM configuration information.

20 Claims, 10 Drawing Sheets

(51) Int. Cl.
  *H04L 41/0895* (2022.01)
  *H04L 41/34* (2022.01)

(56) References Cited

U.S. PATENT DOCUMENTS

| | | | |
|---|---|---|---|
| 2006/0031480 A1 | 2/2006 | Nijemcevic et al. | |
| 2010/0118708 A1 | 5/2010 | Long et al. | |
| 2011/0075574 A1 | 3/2011 | Perelstain et al. | |
| 2011/0292941 A1 | 12/2011 | Yatsu et al. | |
| 2012/0271928 A1 | 10/2012 | Kern et al. | |
| 2015/0019713 A1* | 1/2015 | Bugenhagen | G06F 11/3006 |
| | | | 709/224 |
| 2017/0111209 A1 | 4/2017 | Ward et al. | |
| 2018/0013670 A1* | 1/2018 | Kapadia | H04L 45/66 |
| 2018/0109450 A1* | 4/2018 | Filsfils | H04L 45/04 |
| 2018/0331890 A1* | 11/2018 | Song | H04L 1/1614 |
| 2018/0331933 A1* | 11/2018 | Song | H04L 69/22 |
| 2019/0028909 A1* | 1/2019 | Mermoud | G06N 3/0499 |
| 2019/0253328 A1* | 8/2019 | Kolar | G06F 11/0778 |
| 2019/0386921 A1* | 12/2019 | Pignataro | H04L 67/10 |
| 2020/0084143 A1* | 3/2020 | Gandhi | H04L 45/24 |
| 2020/0099611 A1* | 3/2020 | Filsfils | H04L 45/302 |
| 2020/0145318 A1* | 5/2020 | Nainar | H04L 69/22 |
| 2020/0322264 A1* | 10/2020 | Clad | H04L 45/22 |
| 2020/0322353 A1* | 10/2020 | Bhandari | H04L 63/1425 |
| 2020/0389397 A1* | 12/2020 | Stammers | H04L 12/4625 |
| 2021/0083973 A1* | 3/2021 | Peng | H04L 45/02 |
| 2021/0084530 A1* | 3/2021 | Song | H04W 28/0231 |

FOREIGN PATENT DOCUMENTS

| | | | |
|---|---|---|---|
| CN | 101355441 A | 1/2009 | |
| CN | 101651582 A | 2/2010 | |
| CN | 102388567 A | 3/2012 | |
| CN | 105577413 A | 5/2016 | |
| CN | 105790988 A | 7/2016 | |
| CN | 105871721 A | 8/2016 | |
| CN | 108964943 A | 12/2018 | |
| CN | 109218058 A | 1/2019 | |
| EP | 3070879 A1 | 9/2016 | |
| WO | 2009015594 A1 | 2/2009 | |

OTHER PUBLICATIONS

R. Hinden et al., "IPv6 Minimum Path MTU Hop-by-Hop Option," draft-ietf-6man-mtu-option-00, Aug. 9, 2019, 16 pages.

S. Previdi et al., "Advertising Segment Routing Policies in BGP," draft-ietf-idr-segment-routing-te-policy-07, Jul. 5, 2019, 47 pages.

Sun Wengsheng et al., "Research on OAM Mechanism for Multi-Protocol Label Switching and Implementation," Chinese Journal of Electron Devices, vol. 32, No. 5, Oct. 2009, with an English Abstract, 4 pages.

RFC 8321, G. Fioccola, Ed et al., "Alternate-Marking Method for Passive and Hybrid Performance Monitoring," Jan. 2018, 33 pages.

* cited by examiner

Tunnel Encaps Attribute

Tunnel Encaps Attribute

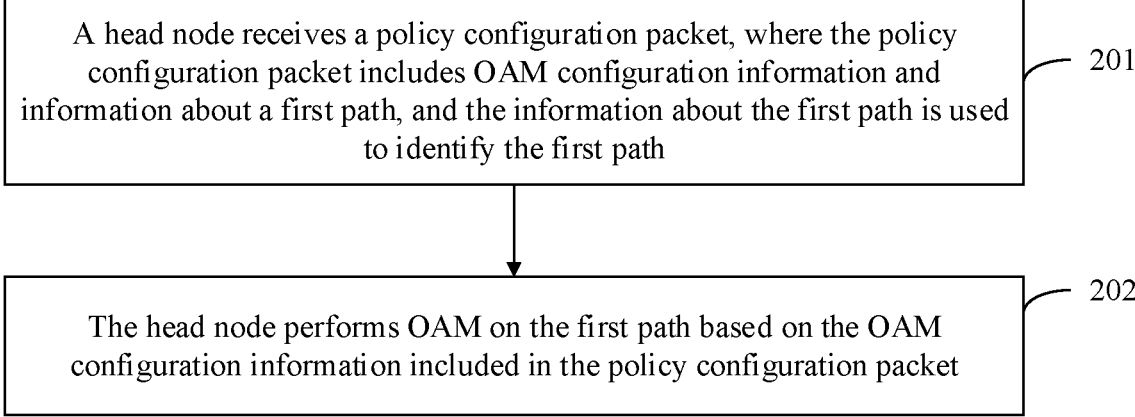

A head node receives a policy configuration packet, where the policy configuration packet includes OAM configuration information and information about a first path, and the information about the first path is used to identify the first path — 201

The head node performs OAM on the first path based on the OAM configuration information included in the policy configuration packet — 202

FIG. 15

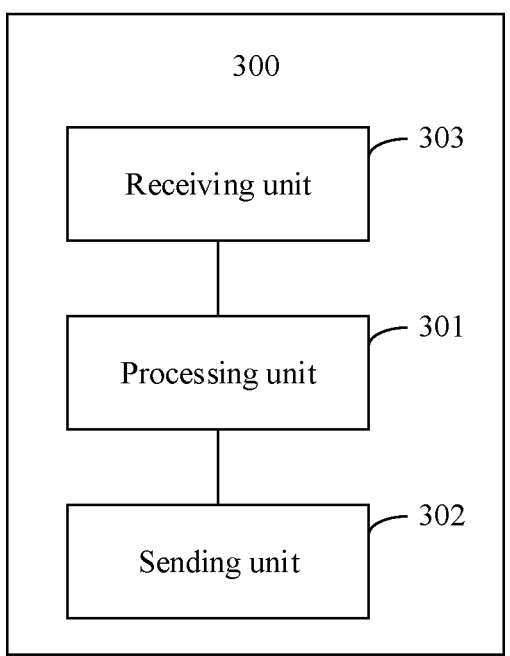

300

Receiving unit — 303

Processing unit — 301

Sending unit — 302

Receiving unit — 401

Processing unit — 402

Sending unit — 403

METHOD, APPARATUS, AND SYSTEM FOR SENDING PACKET AND RECEIVING PACKET TO PERFORM OAM

CROSS-REFERENCE TO RELATED APPLICATIONS

This is a continuation of International Patent Application No. PCT/CN2020/117246 filed on Sep. 23, 2020, which claims priority to Chinese Patent Application No. 201911115441.5 filed on Nov. 14, 2019. The disclosures of the aforementioned applications are hereby incorporated by reference in their entireties.

TECHNICAL FIELD

This disclosure relates to the communication field, and in particular, to a method, an apparatus, and a system for sending a packet and receiving a packet to perform operations, administration, and maintenance (OAM).

BACKGROUND

Network management includes OAM. By performing the OAM, fault detection, path discovery, fault locating, and performance monitoring can be completed, to implement network analysis, prediction, planning, and configuration, and test and perform fault management on a service flow transmitted in a network.

Currently, the OAM may be performed on the service flow. A procedure of performing the OAM on the service flow may be: configuring identification information of the service flow on a head node (for example, a switch or a router) of a forwarding path, where the forwarding path is a path used to transmit the service flow in the network, and the identification information may be 5-tuple information of the service flow (including a source address, a destination address, a source port number, a destination port number, and a protocol type of the service flow). When receiving the service flow corresponding to the identification information, the head node performs the OAM on the service flow.

Currently, the OAM is not only performed on the service flow, but also needs to be performed on the forwarding path. When the OAM is performed on the forwarding path, all service flows transmitted on the forwarding path need to be first determined, and then identification information of each determined service flow needs to be configured on the head node. When receiving a service flow corresponding to any piece of the configured identification information, the head node performs the OAM on the service flow, to implement the OAM on the forwarding path.

In a process of implementing this disclosure, the inventors find that a conventional technology has the following problems.

Currently, it is difficult to determine all the service flows transmitted on the forwarding path. Consequently, it is relatively difficult to perform the OAM on the forwarding path. In addition, the identification information of each determined service flow needs to be configured on the head node, and a relatively large quantity of times of configuration leads to relatively low efficiency of performing the OAM on the forwarding path.

SUMMARY

This disclosure provides a method, an apparatus, and a system for sending a packet and receiving a packet, to reduce difficulty of performing OAM on a path and improve efficiency of performing the OAM on the path. The technical solutions are as follows.

According to a first aspect, this disclosure provides a method for sending a packet. In the method, a controller generates a policy configuration packet, where the policy configuration packet includes OAM configuration information and information about a first path, and the information about the first path is used to identify the first path. The controller sends the policy configuration packet to a head node of the first path, and the policy configuration packet is used to indicate the head node to perform OAM on the first path based on the OAM configuration information. In this way, when the OAM is performed on the first path, there is no need to determine all service flows transmitted on the first path and configure identification information of each service flow on the head node, so that difficulty of performing the OAM on the first path is reduced, and efficiency of performing the OAM on the first path is improved.

In a possible implementation, the policy configuration packet is a segment routing policy (SR Policy) configuration packet, the SR Policy configuration packet includes information about a candidate path, the candidate path includes a segment list, and the first path is the candidate path or a path identified by the segment list. In this way, the OAM can be performed on the first path defined in an SR Policy. In this way, when performance of the first path changes, the head node can sense a change in the performance of the first path by performing the OAM on the first path.

In another possible implementation, when the first path is the candidate path, the SR Policy configuration packet further includes identification information, and the identification information is used to indicate the head node to perform the OAM on the candidate path based on the OAM configuration information when the candidate path is an active path. In this way, the head node may be indicated, by using the identification information, to perform the OAM on the active path.

In another possible implementation, the controller receives an OAM data packet, where the OAM data packet is obtained by performing the OAM on the first path. In this way, the controller may sense, based on the OAM data packet, a change in performance of the first path.

In another possible implementation, the policy configuration packet is a Border Gateway Protocol (BGP) packet or a Path Computation Element Communication Protocol (PCEP) packet.

In another possible implementation, the OAM configuration information includes at least one of an OAM manner, an OAM object, an OAM granularity, or an OAM frequency.

In another possible implementation, the OAM manner includes at least one of the following manners: in-situ operations, administration and maintenance (IOAM), Internet Protocol flow performance measurement (IPFPM), in-situ flow information telemetry (iFIT), Two-Way Active Measurement Protocol (TWAMP), One-way Active Measurement Protocol (OWAMP), and PING.

According to a second aspect, this disclosure provides a method for receiving a packet. In the method, a head node receives a policy configuration packet, where the policy configuration packet includes OAM configuration information and information about a first path, and the information about the first path is used to identify the first path. The head node performs OAM on the first path based on the OAM configuration information. In this way, when the OAM is performed on the first path, there is no need to determine all service flows transmitted on the first path and configure identification information of each service flow on the head node, so that difficulty of performing the OAM on the first path is reduced, and efficiency of performing the OAM on the first path is improved.

In a possible implementation, the policy configuration packet is an SR Policy configuration packet, the SR Policy configuration packet includes information about a candidate path, the candidate path includes a segment list, and the first path is the candidate path or a path identified by the segment list. In this way, the OAM can be performed on the first path defined in an SR Policy. In this way, when performance of the first path changes, the head node can sense a change in the performance of the first path by performing the OAM on the first path.

In another possible implementation, the head node obtains OAM execution information based on the OAM configuration information, receives a first packet, adds the OAM execution information to the first packet to generate a second packet, and sends the second packet through the first path. In this way, the OAM is performed on the first path.

In another possible implementation, the head node generates a first packet based on the OAM configuration information, where the first packet includes OAM execution information. The head node sends the first packet through the first path. In this way, the OAM is actively performed on the first path.

In another possible implementation, when the first path is the candidate path, the head node obtains identification information, and the identification information is used to indicate the head node to perform the OAM on the candidate path based on the OAM configuration information when the candidate path is an active path. In this way, the head node may be indicated, by using the identification information, to perform the OAM on the active path.

In another possible implementation, the head node performs the OAM on the first path, to obtain an OAM data packet. The head node sends the OAM data packet to a controller. In this way, the controller receives the OAM data packet, and may sense, based on the OAM data packet, a change in performance of the first path.

In another possible implementation, the policy configuration packet is a BGP packet or a PCEP packet.

According to a third aspect, this disclosure provides an apparatus for sending a packet, configured to perform the method according to any one of the first aspect or the possible implementations of the first aspect. The apparatus includes units configured to perform the method according to any one of the first aspect or the possible implementations of the first aspect.

According to a fourth aspect, this disclosure provides an apparatus for receiving a packet, configured to perform the method according to any one of the second aspect or the possible implementations of the second aspect. The apparatus includes units configured to perform the method according to any one of the second aspect or the possible implementations of the second aspect.

According to a fifth aspect, this disclosure provides an apparatus for sending a packet. The apparatus includes a processor, a memory, and a transceiver. The processor, the memory, and the transceiver may be connected by using a bus system. The memory is configured to store one or more programs, and the processor is configured to execute the one or more programs in the memory, to complete the method according to any one of the first aspect or the possible implementations of the first aspect.

According to a sixth aspect, this disclosure provides an apparatus for receiving a packet. The apparatus includes a processor, a memory, and a transceiver. The processor, the memory, and the transceiver may be connected by using a bus system. The memory is configured to store one or more programs, and the processor is configured to execute the one or more programs in the memory, to complete the method according to any one of the second aspect or the possible implementations of the second aspect.

According to a seventh aspect, this disclosure provides a computer-readable storage medium. The computer-readable storage medium stores program code. When the program code is run on a computer, the computer is enabled to perform the method in any one of the first aspect, the second aspect, the possible implementations of the first aspect, or the possible implementations of the second aspect.

According to an eighth aspect, this disclosure provides a computer program product including program code. When the computer program product runs on a computer, the computer is enabled to perform the method in any one of the first aspect, the second aspect, the possible implementations of the first aspect, or the possible implementations of the second aspect.

According to a ninth aspect, this disclosure provides a system for receiving a packet, including the apparatus according to the third aspect and the apparatus according to the fourth aspect, or the apparatus according to the fifth aspect and the apparatus according to the sixth aspect.

BRIEF DESCRIPTION OF DRAWINGS

FIG. 15 is a flowchart of a method for receiving a packet to perform OAM according to an embodiment of this disclosure;

FIG. 16 is a schematic diagram of a structure of an apparatus for sending a packet to perform OAM according to an embodiment of this disclosure;

DESCRIPTION OF EMBODIMENTS

The following further describes in detail implementations of this disclosure with reference to the accompanying drawings.

OAM means operations, administration and maintenance. Performing the OAM on a communication network refers to collecting OAM information by a node on the communication network. The OAM is defined as follows: (1) monitoring performance and generating maintenance information, to evaluate stability of a network based on the maintenance information; (2) detecting a network fault through periodically querying and generating various maintenance information and alarm information; (3) when the network fault occurs, scheduling or switching services to other entities to ensure normal running of the network; and (4) transferring fault information to a management entity (for example, a controller).

In conclusion, the OAM performed on the communication network may include fault detection, path discovery, fault locating, performance monitoring, and the like. A node in an OAM domain in the communication network may perform the OAM. The OAM domain is a collection of all nodes that support an OAM function and that are in the communication network. The OAM domain usually has an ingress node and an egress node. The ingress node may be referred to as a head node, and the egress node may be referred to as a tail node. There is at least one path between the head node and the tail node, and a node that each path passes through may support the OAM function.

Figure 1:
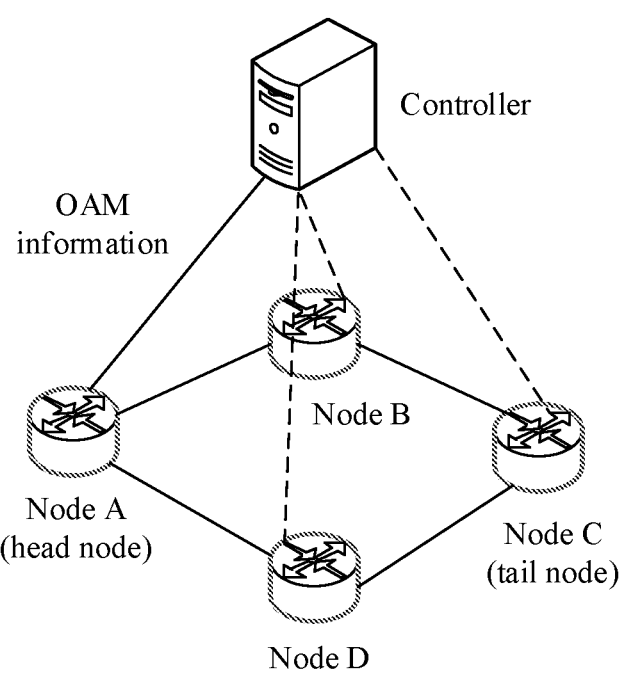
FIG. 1 is a schematic diagram of a network architecture according to an embodiment of this disclosure.

For example, refer to a network architecture shown in FIG. 1. It is assumed that the OAM domain includes a node A, a node B, a node C, and a node D in the network architecture. The network architecture further includes a controller. The controller is connected to the node A, and the controller may also be connected to the node B, the node C, and the node D. The node A is the head node in the OAM domain, the head node A is responsible for determining OAM configuration information, the node C is the tail node in the OAM domain, and the head node A or the tail node C may obtain an OAM result based on OAM information collected by all nodes that are in the OAM domain, and reports the OAM result to the controller. In the OAM domain, there are two paths between the head node A and the tail node C. One path includes the nodes A, B, and C, and the other path includes the nodes A, D, and C.

Optionally, the node in the communication network may be a network device, for example, may be a device such as a router or a switch.

Currently, the OAM needs to be performed on a path in the OAM domain. To perform the OAM on the path in the OAM domain, the controller may generate a policy configuration packet, where the policy configuration packet includes the OAM configuration information and information about a first path. The information about the first path is used to identify the first path, and the first path is a path between the head node and the tail node; and may send the policy configuration packet to the head node. The head node receives the policy configuration packet, and performs, based on the OAM configuration information, the OAM on the first path identified by the information about the first path.

Figure 3:
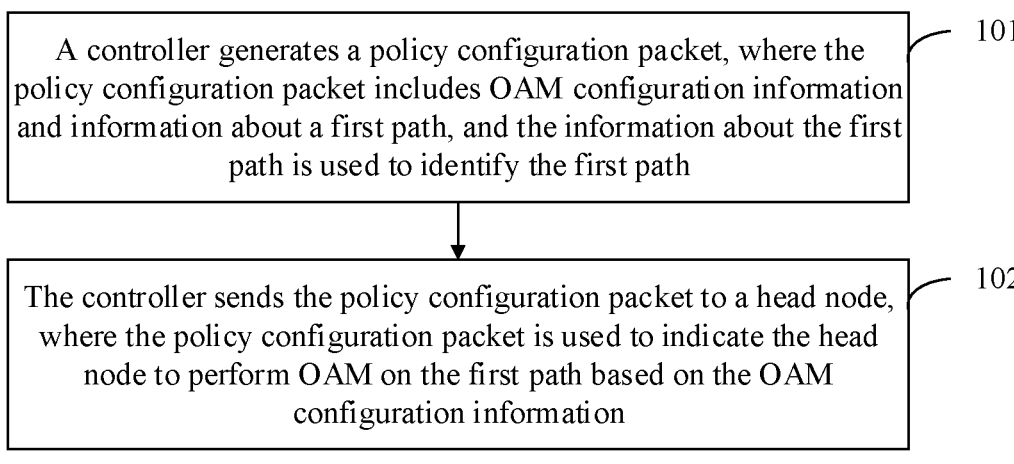
FIG. 3 is a flowchart of a method for sending a packet to perform OAM according to an embodiment of this disclosure.

For a detailed implementation process in which the controller generates the policy configuration packet to send the policy configuration packet to the head node, refer to the following embodiment shown in FIG. 3. For a detailed implementation process in which the head node receives the policy configuration packet and performs the OAM on the first path, refer to the following embodiment shown in FIG. 15. Details are not described herein.

Optionally, the network architecture shown in FIG. 1 may be used in an SR Policy scenario, an SR Traffic Engineering (SR TE) scenario, or the like. The SR Policy scenario or the SR TE scenario includes a head node, a tail node, and at least one path between the head node and the tail node. In addition, a node that each path passes through usually supports an OAM function.

Optionally, the following uses the SR Policy scenario as an example for description. In the SR Policy scenario, the policy configuration packet is an SR Policy configuration packet. The SR Policy configuration packet includes information about a candidate path, the candidate path includes a segment list, and the first path is the candidate path or a path identified by the segment list.

Figure 2:
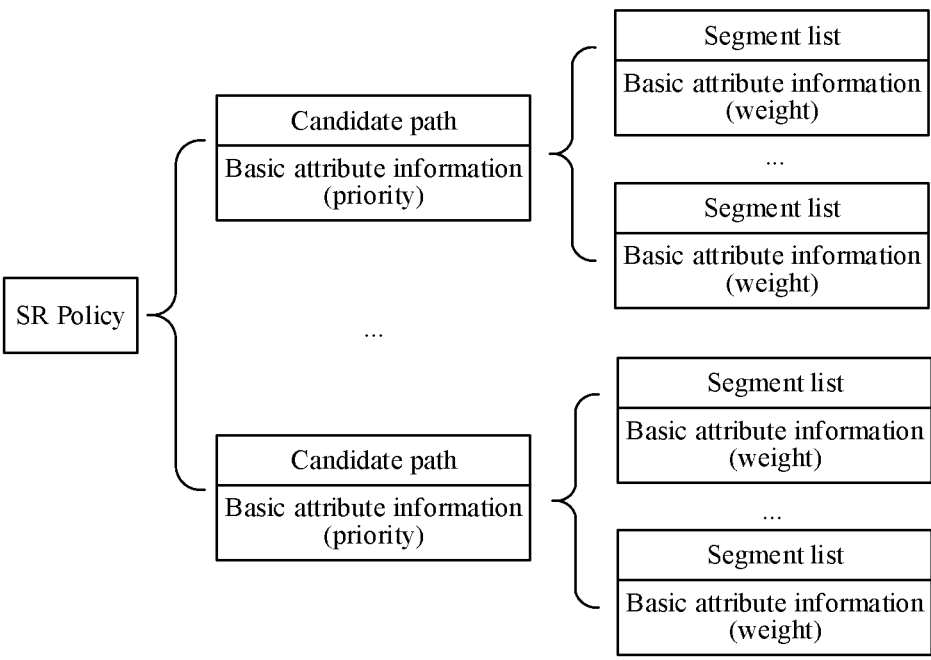
FIG. 2 is a schematic diagram of a structure of an SR Policy according to an embodiment of this disclosure.

Optionally, the controller sends the SR Policy configuration packet to the head node when configuring an SR Policy between the head node and the tail node, and configures the SR Policy between the head node and the tail node based on the SR Policy configuration packet. The SR policy defines the head node, tail node, and performance requirement information. Refer to FIG. 2. The SR Policy further defines at least one candidate path between the head node and the tail node, each candidate path includes at least one segment list, and each segment list is used to identify a path between the head node and the tail node.

Optionally, the performance requirement information includes a parameter threshold of at least one performance parameter. For example, the at least one performance parameter includes one or more of a delay, a packet loss rate, and the like. The parameter threshold includes one or more of a delay threshold, a packet loss rate threshold, and the like. The delay threshold is used to indicate that when the path defined in the SR Policy is used to transmit a service, the SR Policy can ensure that a delay generated on the path does not exceed the delay threshold as far as possible. The packet loss rate threshold is used to indicate that when the path defined in the SR Policy is used to transmit a service, the SR Policy can ensure that a packet loss rate generated on the path does not exceed the packet loss rate threshold as far as possible.

Each of the at least one candidate path includes at least one segment list. Optionally, when each candidate path includes a plurality of segment lists, load balancing may be performed among the plurality of segment lists. Optionally, the head node may alternatively select one or more segment lists from the at least one segment list, and send the service by using a path identified by the selected segment list.

Optionally, refer to FIG. 2. The SR Policy further defines basic attribute information of each candidate path. Basic attribute information of any candidate path includes information such as a priority of the any candidate path. When the any candidate path is an active path, the basic attribute information of the any candidate path further includes identification information binding segment identifier (Binding SID) of the SR Policy.

Optionally, refer to FIG. 2. The SR Policy further defines basic attribute information of each segment list. Basic attribute information of any segment list includes a weight of the any segment list, and the like.

Optionally, there is one active path in the at least one candidate path, and another candidate path in the at least one candidate path is an inactive path. When the head node needs to send a service to the tail node, the head node may send the service to the tail node by using the active path.

After the SR Policy is configured, it is necessary to perform the OAM on the candidate path defined in the SR Policy or the path identified by the segment list defined in the SR Policy. When the OAM is performed on a candidate path or a path identified by a segment list, it may be found in time that performance provided by the candidate path or performance provided by the path identified by the segment list cannot meet the performance requirement information defined in the SR Policy. For a detailed implementation process, refer to the embodiment shown in FIG. 3 or FIG. 15.

Refer to FIG. 3. An embodiment of this disclosure provides a method for sending a packet. The method may be applied to the network architecture shown in FIG. 1, and includes the following steps.

Step 101: A controller generates a policy configuration packet, where the policy configuration packet includes OAM configuration information and information about a first path, and the information about the first path is used to identify the first path.

Optionally, the policy configuration packet is an SR Policy configuration packet, the SR Policy configuration packet includes information about a target candidate path, the target candidate path includes a target segment list, and the first path is the target candidate path or a path identified by the target segment list.

The target candidate path is one or more candidate paths in at least one candidate path defined in an SR Policy. The target segment list is one or more segment lists in at least one segment list included in the target candidate path. The OAM configuration information is OAM configuration information of the first path.

The controller sends the SR Policy configuration packet to a head node when configuring, on the head node, the SR Policy between the head node and a tail node. The SR Policy configuration packet includes basic configuration information of the SR Policy and the OAM configuration information of the first path.

Refer to FIG. 2. The basic configuration information includes information about the at least one candidate path defined in the SR Policy, performance requirement information defined in the SR Policy, and the like. Information about any candidate path includes basic attribute information of the candidate path, at least one segment list, and basic attribute information of each segment list. The first path (target candidate path) is one or more candidate paths in the at least one candidate path, or the first path (target segment list) is one or more segment lists in the target candidate path.

Optionally, the OAM configuration information may include an OAM attribute. The OAM attribute may include at least one of an OAM manner, an OAM object, an OAM granularity, or an OAM frequency.

Optionally, the OAM object may include one or more performance parameters such as a delay and a packet loss rate.

Optionally, the OAM manner includes an in-band OAM manner or an out-band OAM manner. The in-band OAM manner includes IOAM, iFIT, alternate marking, an abstract in-band flow analyzer (IFA), an IPFPM, iFIT, and the like. The out-band OAM manner includes a TWAMP, an OWAMP, PING, a simple two-way active measurement protocol (STAMP), TWAMP light, and the like.

Optionally, when the first path is the target candidate path, a first field in the SR Policy configuration packet includes basic attribute information of the target candidate path, a second field in the SR Policy configuration packet includes the OAM configuration information of the first path, and the second field is adjacent to the first field or is located in the first field.

Optionally, when the first path is the target segment list, a third field in the SR Policy configuration packet includes the target segment list, a fourth field in the SR Policy configuration packet includes the OAM configuration information of the first path, and the fourth field is adjacent to the third field or is located in the third field.

Figure 4:
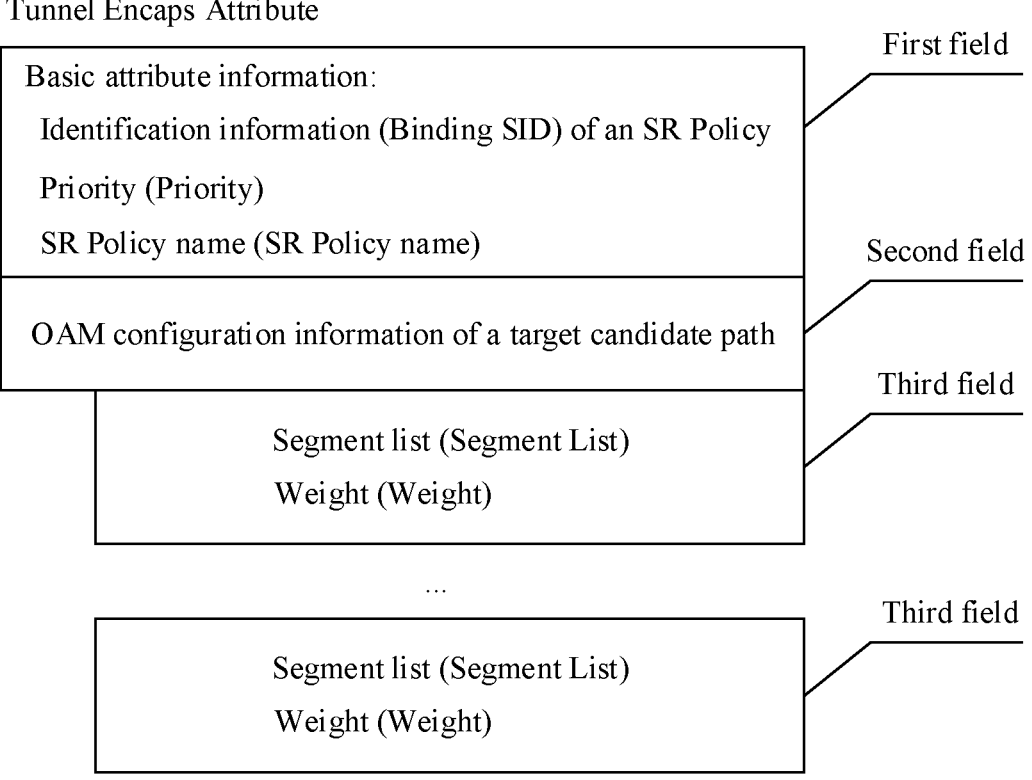
FIG. 4 is a schematic diagram of a structure of an SR Policy configuration packet according to an embodiment of this disclosure.

For example, refer to FIG. 4. The SR Policy configuration packet is a BGP packet, and the controller may generate at least one BGP packet. Any BGP packet may include information about a candidate path. The BGP packet shown in FIG. 4 includes a first field and at least one third field after the first field. It is assumed that the first field includes the basic attribute information of the target candidate path and is located in any third field after the first field. The any third field includes a segment list in the target candidate path and basic attribute information of the segment list. Optionally, the first field may further include information such as a name of the SR Policy.

Figure 5:
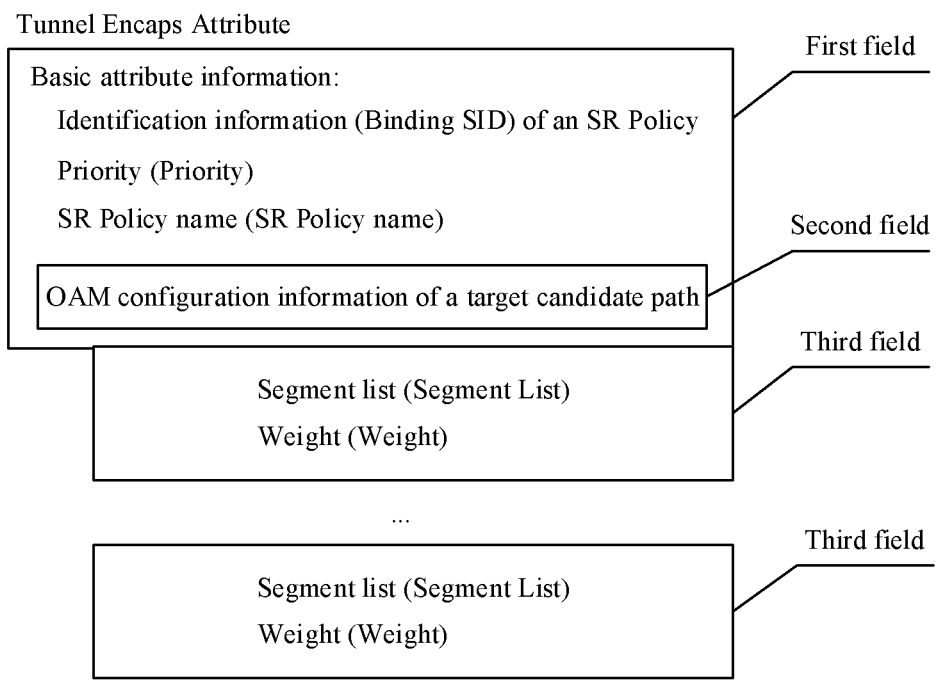
FIG. 5 is a schematic diagram of a structure of another SR Policy configuration packet according to an embodiment of this disclosure.

Refer to FIG. 4. When the first path is the target candidate path, a second field in the BGP packet includes OAM configuration information of the target candidate path, and the second field is adjacent to the first field or is located in the first field. For example, in the example shown in FIG. 4, the second field is adjacently after the first field, and is used to indicate that OAM configuration information in the second field is the OAM configuration information of the target candidate path. Alternatively, in the example shown in FIG. 5, the second field is located in the first field, and is used to indicate that OAM configuration information in the second field is the OAM configuration information of the target candidate path.

Optionally, the first field is a TLV field. When the first field is adjacent to the second field, the second field is also a TLV field. When the second field is located in the first field, the second field is a sub-TLV field located in the first field.

Figure 6:
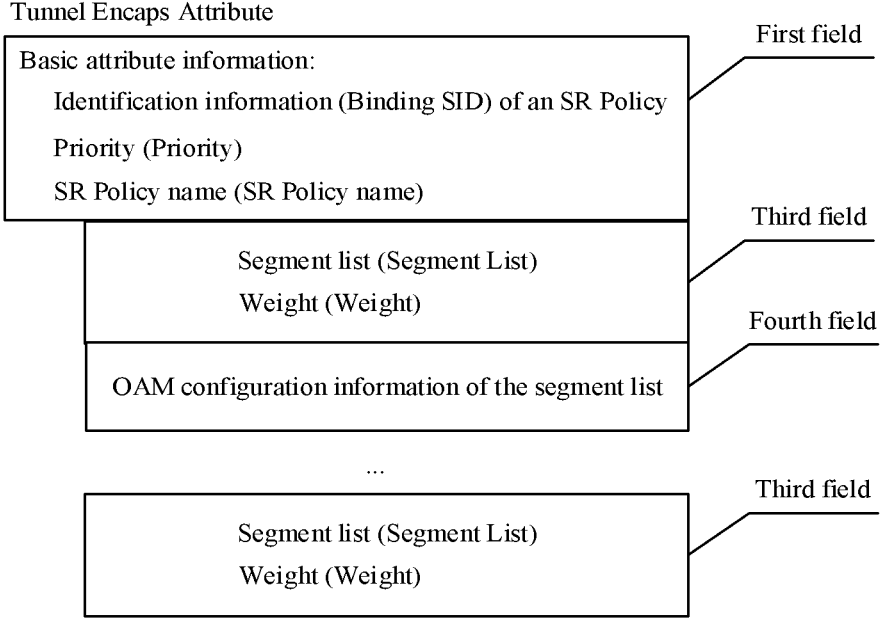
FIG. 6 is a schematic diagram of a structure of another SR Policy configuration packet according to an embodiment of this disclosure.
Figure 7:
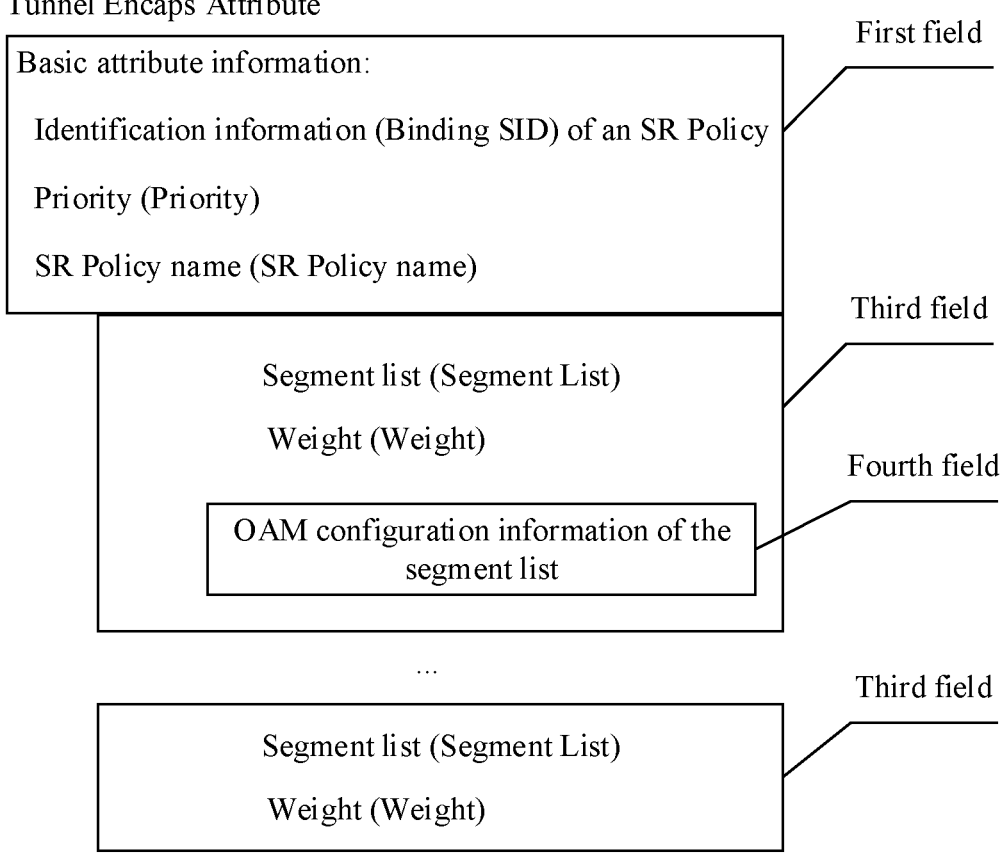
FIG. 7 is a schematic diagram of a structure of another SR Policy configuration packet according to an embodiment of this disclosure.

Refer to FIG. 6. When the first path is the path identified by the target segment list included in the target candidate path, a fourth field in the BGP packet includes OAM configuration information of the target segment list, a third field in the BGP packet includes the target segment list and basic attribute information of the target segment list, and the fourth field is adjacent to the third field or is located in the third field. For example, in the example shown in FIG. 6, the fourth field is adjacently after the third field, and is used to indicate that OAM configuration information in the fourth field is the OAM configuration information of the target segment list. Alternatively, in the example shown in FIG. 7, the fourth field is located in the third field, and is used to indicate that OAM configuration information in the fourth field is the OAM configuration information of the target segment list.

Optionally, the third field is a TLV field. The third field includes a plurality of sub-TLV fields, the target segment list includes a plurality of segments, and each segment may correspond to one sub-TLV field. A sub-TLV field corresponding to any segment includes the segment. The basic attribute information of the target segment list corresponds to at least one sub-TLV, and the at least one sub-TLV field includes the basic attribute information of the target segment list.

When the third field is adjacent to the fourth field, the fourth field is also a TLV field. Alternatively, when the fourth field is located in the third field, the fourth field is a sub-TLV field located in the third field.

Figure 8:
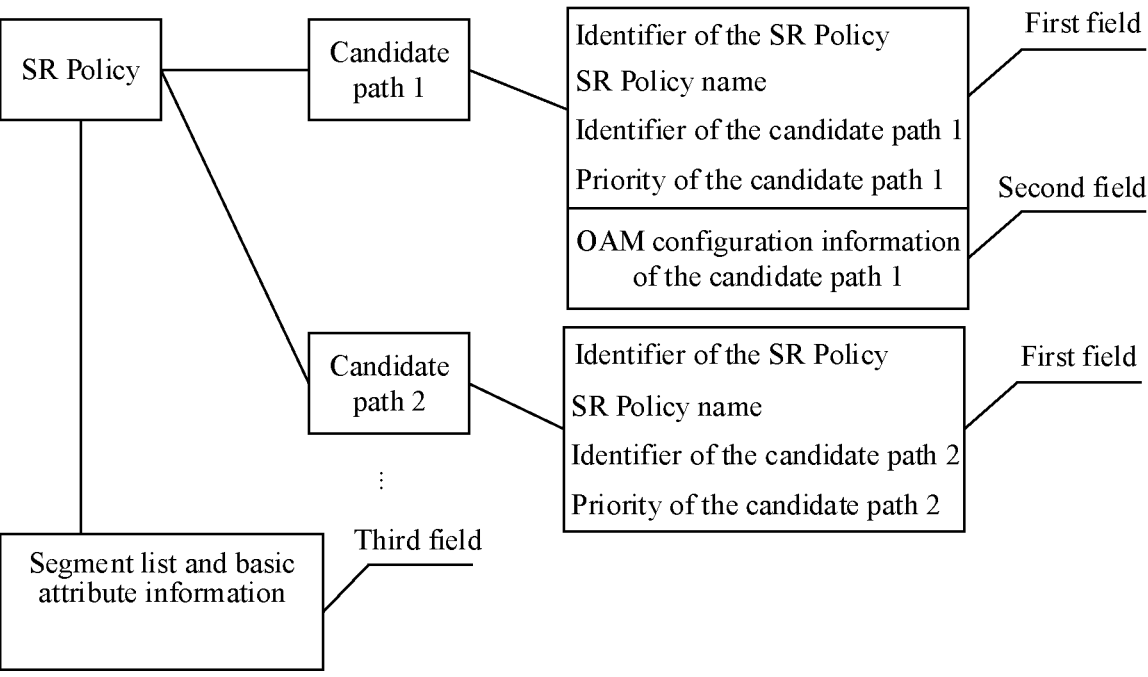
FIG. 8 is a schematic diagram of a structure of another SR Policy configuration packet according to an embodiment of this disclosure.

For example, refer to FIG. 8. The SR Policy configuration packet is a PCEP packet, and the controller may generate at least one PCEP packet. Any PCEP packet may include basic attribute information of each candidate path defined in the SR Policy, a segment list included in one candidate path, and the basic attribute information of the target segment list.

Optionally, when the SR Policy configuration packet is the PCEP packet, a candidate path defined in the SR Policy includes a segment list. The controller may configure one candidate path on the head node by using one PCEP packet. In this way, the controller needs to configure candidate paths of the SR Policy between the head node and the tail node by using the at least one PCEP packet.

For example, it is assumed that the PCEP packet shown in FIG. 8 is used to configure the target candidate path, the target candidate path includes the target segment list, and the PCEP packet includes a first field corresponding to each candidate path and a third field corresponding to the target segment list included in the target candidate path. A first field corresponding to any candidate path includes basic attribute information of the any candidate path. The basic attribute information of the any candidate path includes an identifier and a priority of the any candidate path. Optionally, the first field corresponding to the any candidate path further includes an identifier and a name of the SR Policy. The third field corresponding to the target segment list includes the target segment list and the basic attribute information of the target segment list.

Optionally, refer to FIG. 8. The first field corresponding to the any candidate path includes four TLV fields: a first TLV, a second TLV, a third TLV, and a fourth TLV. The first TLV includes the identifier of the SR Policy, the second TLV includes the name of the SR Policy, the third TLV includes the identifier of the any candidate path, and the fourth TLV includes the priority of the any candidate path. The third field is a TLV field, and the TLV field includes the target segment list and the basic attribute information of the target segment list. In the PCEP packet, the third field may also include a plurality of sub-TLV fields, the target segment list includes a plurality of segments, and each segment may correspond to one sub-TLV field. A sub-TLV field corresponding to any segment includes the segment. The basic attribute information of the target segment list corresponds to at least one sub-TLV, and the at least one sub-TLV field includes the basic attribute information of the target segment list.

Figure 9:
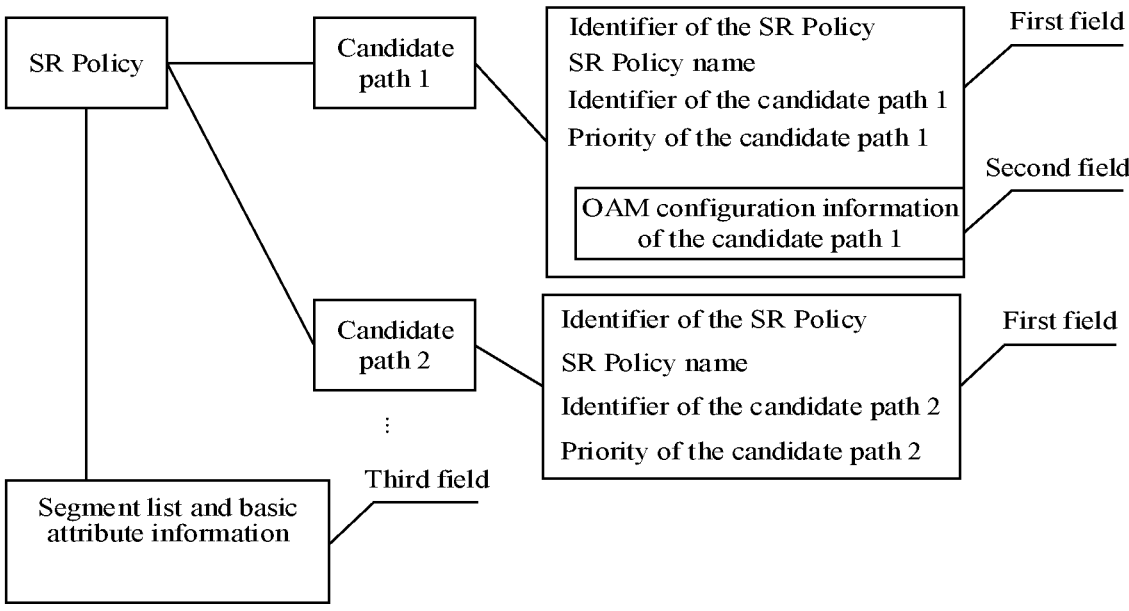
FIG. 9 is a schematic diagram of a structure of another SR Policy configuration packet according to an embodiment of this disclosure.

Refer to FIG. 8. When the first path is the target candidate path, it is assumed that the target candidate path is a candidate path 1, a second field in the PCEP packet includes OAM configuration information of the target candidate path, and the second field is adjacent to the first field corresponding to the target candidate path or is located in the first field corresponding to the target candidate path. For example, in the example shown in FIG. 8, the second field is adjacently after the first field corresponding to the target candidate path, and is used to indicate that OAM configuration information in the second field is the OAM configuration information of the target candidate path. Alternatively, in the example shown in FIG. 9, the second field is located in the first field corresponding to the target candidate path, and is used to indicate that OAM configuration information in the second field is the OAM configuration information of the target candidate path.

Figure 10:
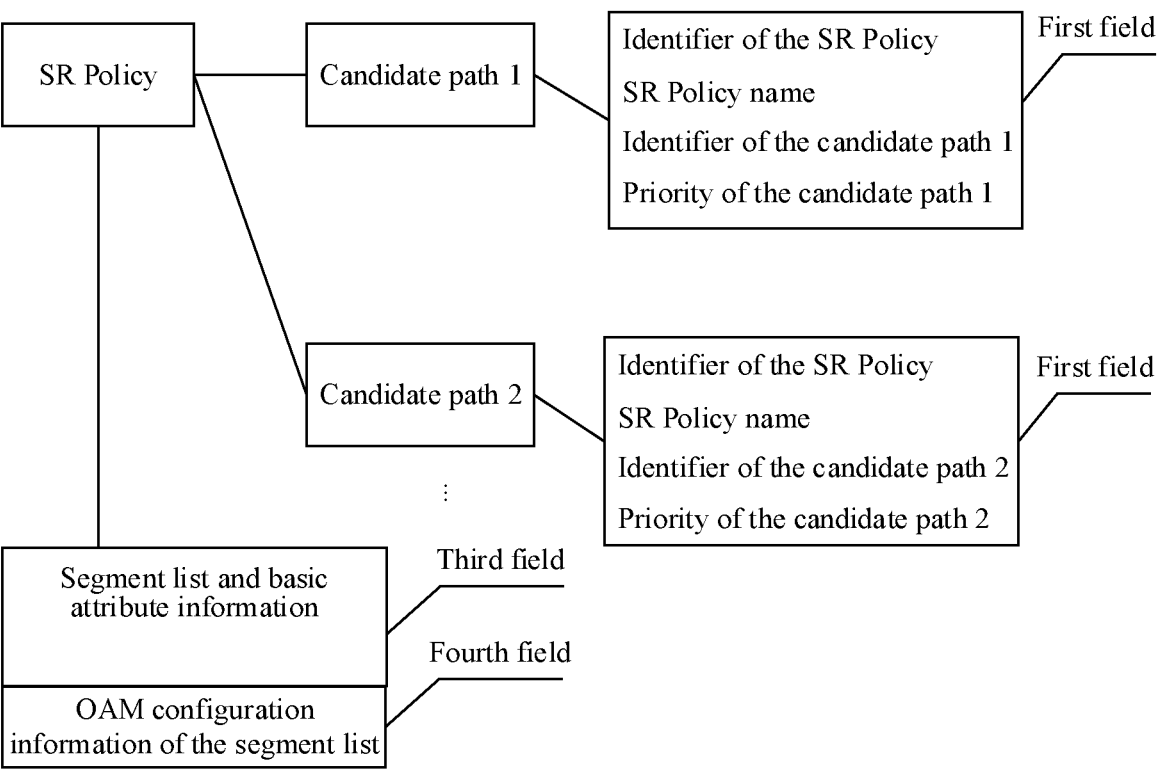
FIG. 10 is a schematic diagram of a structure of another SR Policy configuration packet according to an embodiment of this disclosure.
Figure 11:
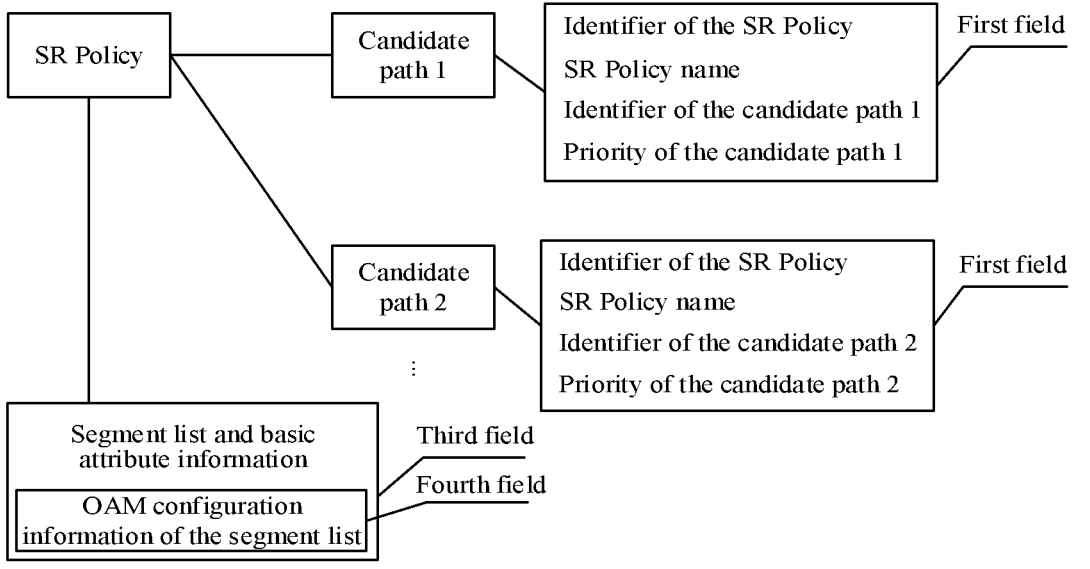
FIG. 11 is a schematic diagram of a structure of another SR Policy configuration packet according to an embodiment of this disclosure.

Refer to FIG. 10. When the first path is the path identified by the target segment list included in the target candidate path, a fourth field in the PCEP packet includes OAM configuration information of the target segment list, a third field in the PCEP packet includes the target segment list and the basic attribute information of the target segment list, and the fourth field is adjacent to the third field or is located in the third field. For example, in the example shown in FIG. 10, the fourth field is adjacently after the third field, and is used to indicate that OAM configuration information in the fourth field is the OAM configuration information of the target segment list. Alternatively, in the example shown in FIG. 11, the fourth field is located in the third field, and is used to indicate that OAM configuration information in the fourth field is the OAM configuration information of the target segment list.

In the PCEP packet, when the third field is adjacent to the fourth field, the fourth field is also a TLV field. Alternatively, when the fourth field is located in the third field, the fourth field is a sub-TLV field located in the third field.

Optionally, the second field including the OAM configuration information of the target candidate path or the fourth field including the OAM configuration information of the target segment list is a TLV field. The TLV field includes three subfields: type, length, and value. The type subfield may be used to include an OAM manner, and the value subfield may be used to include at least one of an OAM object, an OAM granularity, or an OAM frequency.

Optionally, when the first path is the candidate path, the SR Policy configuration packet further includes identification information. The identification information is used to indicate the head node to perform OAM on an active path, or the identification information is used to indicate the head node to perform OAM on an inactive path and an active path.

Figure 12:
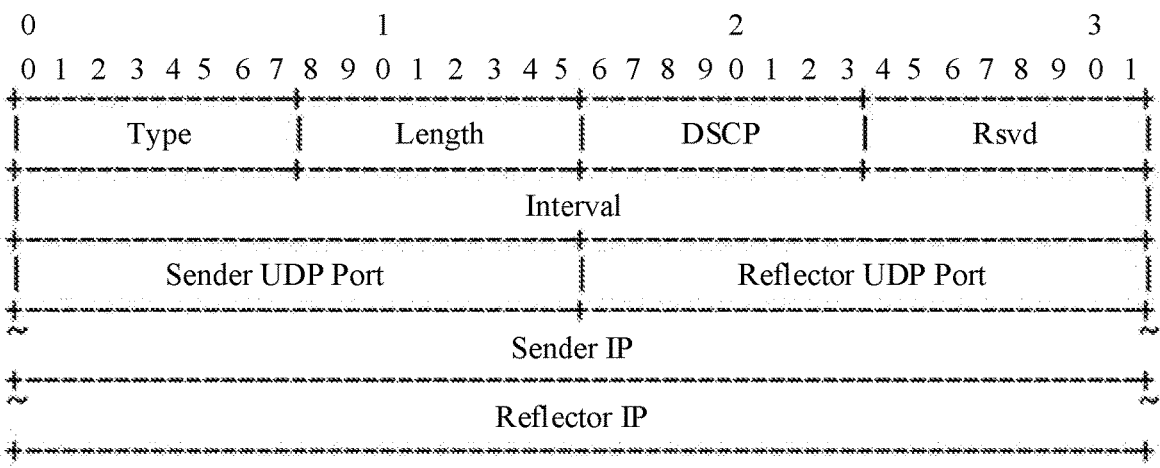
FIG. 12 is a schematic diagram of a structure of a type length value (TLV) field according to an embodiment of this disclosure.

Optionally, in this step, a TLV field may be added to the SR Policy configuration packet, where the TLV field includes the OAM configuration information. Several TLV fields are listed below. Refer to the first TLV field shown in FIG. 12. In the first TLV field, a value of a type (Type) field indicates an OAM manner, and the OAM manner may be a STAMP. In other words, the value of the type field indicates that the first TLV is a STAMP TLV field. The first TLV field further includes an address and a port number of a head node, an address and a port number of a tail node, and an OAM frequency. The first TLV field may not include an OAM object, and the head node includes a default OAM object.

In the first TLV field, a length field indicates a total length of a value field, excluding lengths of the type field and the length field. A differentiated services code point (DSCP) field indicates a DSCP value to be set in a test data packet. An interval field includes the OAM frequency and represents a time interval between two consecutive transmissions of a data packet, where the data packet is a data packet in a test session, and the interval is on a per-microsecond basis. A sender User Datagram Protocol (UDP) port field includes the port number of the head node, indicates a UDP port number of a sender, and a value of the sender UDP port field ranges from 49152 to 65535. A reflector UDP port field includes the port number of the tail node, has a default value 862 (corresponding to a TWAMP test receiver port), and ranges from 1024 to 65535. A sender IP field includes the address of the head node. When the length field occupies 18 bytes, the address of the head node is an Internet Protocol version 4 (IPv4) address. When the length field occupies 42 bytes, the address of the head node is an Internet Protocol version 6 (IPv6) address. A reflector IP field includes the address of the tail node. When the length field occupies 18 bytes, the address of the tail node is an IPv4 address. When the length field occupies 42 bytes, the address of the tail node is an IPv6 address. A reserved (Rsvd) field is a field reserved for further use.

Figure 13:
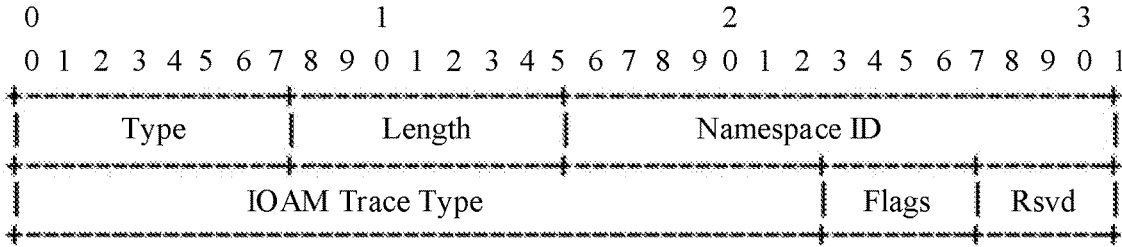
FIG. 13 is a schematic diagram of a structure of another TLV field according to an embodiment of this disclosure.

Refer to the second TLV field shown in FIG. 13. In the second TLV field, a value of a type field indicates an OAM manner, and the OAM manner may be IOAM pre-allocated (IOAM Pre-allocated). In other words, the value of the type field indicates that the second TLV is an IOAM Pre-allocated Trace Option Sub-TLV field. Alternatively, the OAM manner may be an IOAM incremental trace (IOAM Incremental Trace). In other words, the value of the type field indicates that the second TLV is an IOAM Incremental Trace Option Sub-TLV field. A length field indicates a total length of a value field, excluding lengths of the type field and the length field. A Namespace ID field indicates a 16-bit identifier in an IOAM namespace. An IOAM trace type field includes at least one of an OAM object, an OAM granularity, an OAM frequency, or the like, and may be a 24-bit identifier. A flags field may be a 4-bit field. A Rsvd field may be a 4-bit field reserved for further use.

Figure 14:
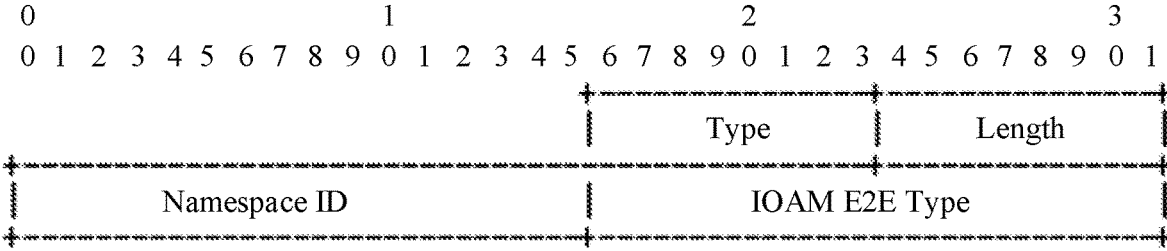
FIG. 14 is a schematic diagram of a structure of another TLV field according to an embodiment of this disclosure.

Refer to the third TLV field shown in FIG. 14. In the third TLV field, a value of a type field indicates an OAM manner, and the OAM manner may be IOAM edge-to-edge or IOAM end-to-end (IOAM Edge-to-Edge). In other words, the value of the type field indicates that the third TLV is an IOAM Edge-to-Edge Option Sub-TLV field. A length field indicates a total length of a value field, excluding lengths of the type field and the length field. A Namespace ID field may represent a 16-bit identifier in an IOAM namespace. An IOAM E2E Type field includes at least one of an OAM object, an OAM granularity, an OAM frequency, or the like, and is a 16-bit identifier.

The type field may be allocated by the Internet Assigned Numbers Authority (IANA). Refer to Table 1. Table 1 describes meanings indicated by different values of the type as an example.

TABLE 1

| Value | Meaning |
| --- | --- |
| 1 | STAMP Sub-TLV |
| 2 | IOAM Pre-allocated Trace Option Sub-TLV |
| 3 | IOAM Incremental Trace Option Sub-TLV |
| 4 | IOAM Edge-to-Edge Trace Option Sub-TLV |

Step 102: The controller sends the policy configuration packet to the head node, where the policy configuration packet is used to indicate the head node to perform the OAM on the first path based on the OAM configuration information.

After receiving the policy configuration packet, the head node performs the OAM on the first path based on the OAM configuration information included in the policy configuration packet. For a detailed implementation process in which the head node performs the OAM, refer to the following embodiment shown in FIG. 15. Details are not described herein.

When performing the OAM on the first path, the head node obtains an OAM data packet, and sends the OAM data packet to the controller. The controller receives the OAM data packet.

In this embodiment of this disclosure, the controller generates the policy configuration packet, where the policy configuration packet includes the OAM configuration information and the information about the first path, and the information about the first path is used to identify the first path, and the controller sends the policy configuration packet to the head node of the first path. In this way, the head node may perform the OAM on the first path based on the OAM configuration information included in the policy configuration packet. In this way, when the OAM is performed on the first path, there is no need to determine all service flows transmitted on the first path and configure identification information of each service flow on the head node, so that difficulty of performing the OAM on the first path is reduced, and efficiency of performing the OAM on the first path is improved. Performance of the first path may be obtained by performing the OAM on the first path, so that when the performance of the first path changes, the change can also be perceived in time. When performing the OAM on the first path, the head node obtains the OAM data packet, and sends the OAM data packet to the controller. In this way, the controller can also perceive the change in the performance of the first path based on the OAM data packet.

Refer to FIG. 15. An embodiment of this disclosure provides a method for receiving a packet to perform OAM. The method is applied to the network architecture shown in FIG. 1, and includes the following steps.

Step 201: A head node receives a policy configuration packet, where the policy configuration packet includes OAM configuration information and information about a first path, and the information about the first path is used to identify the first path.

Optionally, the policy configuration packet may be generated by a controller, and the controller may generate the policy configuration packet in the manner shown in the embodiment shown in FIG. 3. In this step, the head node receives the policy configuration packet sent by the controller.

Optionally, the policy configuration packet is an SR Policy packet, and the SR Policy configuration packet includes basic configuration information of an SR Policy and the OAM configuration information. The basic configuration information includes information about at least one candidate path, performance requirement information of the SR Policy, and the like. Information about any candidate path includes basic attribute information of the candidate path, at least one segment list, and basic attribute information of each segment list.

The first path is one or more candidate paths in the at least one candidate path. For ease of description, the one or more candidate paths are referred to as a target candidate path. Alternatively, the first path is one or more segment lists in the target candidate path. For ease of description, the one or more segment lists are referred to as a target segment list.

Optionally, after receiving the policy configuration packet, the head node may further send a policy response packet to the controller, where the policy response packet includes OAM response information, and the OAM response information is used to indicate whether an OAM function is successfully configured on the head node.

Optionally, when the first path is the target candidate path, the policy configuration packet may include a TLV field corresponding to the target candidate path, and the TLV field may include an OAM response message corresponding to the target candidate path. When the first path is the target segment list, the policy configuration packet may include a TLV field corresponding to the target segment list, and the TLV field may include an OAM response message corresponding to the target segment list.

Step 202: The head node performs OAM on the first path based on the OAM configuration information included in the policy configuration packet.

After receiving the SR Policy configuration packet, the head node may store the basic configuration information of the SR Policy. The head node then performs the OAM on the first path based on the OAM configuration information.

Optionally, when the first path is the target candidate path, the head node determines a first field that is in the SR Policy configuration packet and that includes basic attribute information of the target candidate path, determines, based on the first field, a second field that is in the SR Policy configuration packet and that includes OAM configuration information of the target candidate path, and extracts the OAM configuration information of the target candidate path from the second field.

Optionally, in the SR Policy configuration packet, the head node determines the second field adjacent to the first field, or determines the second field located in the first field.

Optionally, the OAM configuration information of the target candidate path includes at least one of an OAM manner, an OAM object, an OAM granularity, or an OAM frequency.

Optionally, the OAM configuration information of the target candidate path includes the OAM manner, but does not include the OAM object. In this case, the head node obtains a default OAM object. Alternatively, the OAM configuration information of the target candidate path includes the OAM object but does not include the OAM manner. In this case, the head node obtains a default OAM manner.

In this step, when the OAM manner is an in-band OAM manner, the head node obtains OAM execution information based on the OAM configuration information, receives a first packet, adds the OAM execution information to the first packet to generate a second packet, and sends the second packet to a tail node through the candidate path, to perform the OAM on the candidate path.

The head node and the tail node are network devices in a communication network. Therefore, the head node may receive the first packet from another network device or a terminal device.

The OAM execution information obtained by the head node may include the OAM object. After receiving the first packet, when determining to transmit the first packet by using the target candidate path, the head node adds the OAM execution information to a packet header of the first packet, to obtain the second packet.

The target candidate path includes at least one segment list, and the head node selects one or more segment lists from the at least one segment list, and sends the second packet to the tail node by using a path identified by the selected segment list.

The basic configuration information of the SR Policy includes a weight of each of the at least one segment list, and the head node may select one or more of segment lists based on the weight of each segment list.

Any node that a path identified by any selected segment list passes through receives the second packet, collects, based on the OAM object in the second packet, the path identified by the segment list to obtain OAM information, adds the OAM information obtained through collection to the second packet, and then forwards the second packet to the tail node. The tail node receives the second packet, collects, based on the OAM object in the second packet, the path identified by the segment list to obtain OAM information, and obtains an OAM result based on the OAM information collected by the tail node and the OAM information in the second packet.

Optionally, the head node may store identification information, or the SR Policy configuration packet further includes the identification information. The identification information is used to indicate the head node to perform the OAM on an active path, or the identification information is used to indicate the head node to perform the OAM on an inactive path and an active path.

Optionally, an operation of generating the second packet by the head node may be: The head node obtains the identification information, and judges the identification information when determining to transmit the first packet by using the target candidate path. When determining that the identification information is used to indicate the head node to perform the OAM on the active path, the head node determines whether the target candidate path is the active path. If the target candidate path is the active path, the head node adds the OAM execution information to the first packet to generate the second packet, that is, performs the OAM on the target candidate path. If the target candidate path is the inactive path, the head node directly sends the first packet to the tail node. When determining that the identification information is used to indicate the head node to perform the OAM on the inactive path and the active path, the head node directly adds the OAM execution information to the first packet to generate the second packet, that is, directly performs the OAM on the target candidate path.

Optionally, that the head node obtains the identification information may be that the head node obtains the identification information from the received policy configuration packet, that is, the identification information is included in the policy configuration packet. The identification information may be added by the controller to the policy configuration packet.

Optionally, that the head node obtains the identification information may alternatively be that the head node reads the identification information stored by the head node, that is, the identification information is set in the head node. The identification information may be manually configured by a network administrator on the head node. Alternatively, after receiving a control packet sent by the controller, the head node may generate the identification information based on an indication of the control packet, and may store the identification information in the head node.

Optionally, the tail node sends an OAM data packet to the controller, where the OAM data packet includes the OAM result.

For example, assuming that the OAM object is a delay and/or a packet loss rate, the head node adds the delay and/or the packet loss rate to the first packet to generate the second packet, and sends the second packet to the tail node by using the path identified by the selected segment list. The any node that the path identified by the segment list passes through receives the second packet, collects a delay and/or a packet loss rate of the path identified by the segment list (that is, obtains OAM information through collection), adds the delay and/or packet loss rate obtained through collection to the second packet, and then forwards the second packet to the tail node. The tail node receives the second packet, collects a delay and/or a packet loss rate of the path identified by the segment list, and calculates a delay average value based on the delay collected by the tail node and the delay in the second packet, and/or calculates a packet loss rate average value based on the packet loss rate collected by the tail node and the packet loss rate in the second packet, to obtain an OAM result, where the OAM result includes the delay average value and/or the packet loss rate average value.

In this step, when the OAM manner is an out-band OAM manner, the head node generates the first packet based on the OAM configuration information, where the first packet includes OAM execution information, and sends the first packet to the tail node through the candidate path, to perform the OAM on the candidate path.

The OAM execution information obtained by the head node may include the OAM object. A packet header of the first packet generated by the head node includes the OAM execution information.

The candidate path includes at least one segment list, and the head node selects one or more segment lists from the at least one segment list, and sends the first packet to the tail node by using a path identified by the selected segment list.

Any node that the path identified by the selected segment list passes through receives the first packet, collects, based on the OAM object in the first packet, the path identified by the segment list, adds OAM information obtained through collection to the first packet, and then forwards the first packet to the tail node. The tail node receives the first packet, collects, based on the OAM object in the first packet, the path identified by the segment list, adds OAM information obtained through collection to the first packet, and sends the first packet to the head node. In this way, the head node receives the first packet, and obtains an OAM result based on the OAM information in the received first packet.

Optionally, when the head node stores identification information or the SR Policy configuration packet further includes identification information, an operation of generating the first packet by the head node may be: The head node determines usage of the identification information. When determining that the identification information is used to indicate the head node to perform the OAM on an active path, the head node determines whether the target candidate path is the active path. If the target candidate path is the active path, the head node generates the first packet, that is, performs the OAM on the target candidate path. When determining that the identification information is used to indicate the head node to perform the OAM on an inactive path and an active path, the head node directly generates the first packet, that is, directly performs the OAM on the target candidate path.

Optionally, the head node sends an OAM data packet to the controller, where the OAM data packet includes the OAM result.

For example, assuming that the OAM object is a delay and/or a packet loss rate, the packet header of the first packet generated by the head node includes the delay and/or the packet loss rate, and the head node sends the first packet to the tail node by using the path identified by the selected segment list. The any node that the path identified by the segment list passes through receives the first packet, collects a delay and/or a packet loss rate of the path identified by the segment list, adds the delay and/or packet loss rate obtained through collection to the first packet, and then forwards the first packet to the tail node. The tail node receives the first packet, collects a delay and/or a packet loss rate of the path identified by the segment list, adds the delay and/or packet loss rate obtained through collection to the first packet, and sends the first packet to the head node. The head node receives the first packet, and calculates a delay average value based on the delays in the received first packet, and/or calculates a packet loss rate average value based on the packet loss rates in the received first packet, to obtain an OAM result, where the OAM result includes the delay average value and/or the packet loss rate average value.

When the OAM manner is the out-band OAM manner, the OAM configuration information may include the OAM frequency. In this step, the OAM is performed on the target candidate path based on the OAM frequency. In other words, the head node generates the first packet based on the OAM frequency, and sends the first packet to the tail node through the target candidate path.

Optionally, when the first path is the target segment list, the head node determines a third field that is in the SR Policy configuration packet and that includes the target segment list, determines, based on the third field, a fourth field that is in the SR Policy configuration packet and that includes OAM configuration information of the target segment list, and extracts the OAM configuration information of the target segment list from the fourth field.

Optionally, in the SR Policy configuration packet, the head node determines the fourth field adjacent to the third field, or determines the fourth field located in the third field.

Optionally, the OAM configuration information of the target segment list includes at least one of an OAM manner, an OAM object, an OAM granularity, or an OAM frequency.

Optionally, the OAM configuration information of the target segment list includes the OAM manner, but does not include the OAM object. In this case, the head node obtains a default OAM object. Alternatively, the OAM configuration information of the target segment list includes the OAM object but does not include the OAM manner. In this case, the head node obtains a default OAM manner.

In this step, when the OAM manner is the in-band OAM manner, the head node obtains the OAM execution information based on the OAM configuration information, receives the first packet, adds the OAM execution information to the first packet to generate the second packet, and sends the second packet to the tail node through a path identified by the target segment list, to perform the OAM on the path identified by the segment list.

The OAM execution information obtained by the head node may include the OAM object. After receiving the first packet, when determining to transmit the first packet by using the path identified by the target segment list, the head node adds the OAM execution information to the packet header of the first packet, to obtain the second packet.

Any node that the path identified by the target segment list passes through receives the second packet, collects, based on the OAM object in the second packet, the path identified by the target segment list, adds the OAM information obtained through collection to the second packet, and then forwards the second packet to the tail node. The tail node receives the second packet, collects, based on the OAM object in the second packet, the path identified by the target segment list, and obtains the OAM result based on the OAM information obtained by the tail node through collection and the OAM information in the second packet.

Optionally, the tail node sends the OAM data packet to the controller, where the OAM data packet includes the OAM result.

For example, assuming that the OAM object is the delay and/or the packet loss rate, the head node adds the delay and/or the packet loss rate to the first packet to generate the second packet, and sends the second packet to the tail node by using the path identified by the target segment list. The any node that the path identified by the segment list passes through receives the second packet, obtains a delay and/or a packet loss rate by collecting the path identified by the target segment list, adds the delay and/or packet loss rate obtained through collection to the second packet, and then forwards the second packet to the tail node. The tail node receives the second packet, obtains a delay and/or a packet loss rate by collecting the path identified by the target segment list, and calculates a delay average value based on the delay obtained by the tail node through collection and the delay in the second packet, and/or calculates a packet loss rate average value based on the packet loss rate obtained by the tail node through collection and the packet loss rate in the second packet, to obtain an OAM result, where the OAM result includes the delay average value and/or the packet loss rate average value.

In this step, when the OAM manner is the out-band OAM manner, the head node generates the first packet based on the OAM configuration information, where the first packet includes the OAM execution information, and sends the first packet to the tail node through a path identified by the target segment list, to perform the OAM on the path identified by the target segment list.

The OAM execution information obtained by the head node may include the OAM object. The packet header of the first packet generated by the head node includes the OAM execution information.

Any node that the path identified by the target segment list passes through receives the first packet, collects, based on the OAM object in the first packet, the path identified by the target segment list, adds OAM information obtained through collection to the first packet, and then forwards the first packet to the tail node. The tail node receives the first packet, collects, based on the OAM object in the first packet, the path identified by the target segment list, and sends the first packet to the head node. In this way, the head node receives the first packet, and obtains an OAM result based on the OAM information in the received first packet.

Optionally, the head node sends an OAM data packet to the controller, where the OAM data packet includes the OAM result obtained by collecting the target segment list.

For example, assuming that the OAM object is the delay and/or the packet loss rate, the packet header of the first packet generated by the head node includes the delay and/or the packet loss rate, and the head node sends the first packet to the tail node by using the path identified by the target segment list. The any node that the path identified by the target segment list passes through receives the first packet, collects a delay and/or a packet loss rate of the path identified by the target segment list, adds the delay and/or packet loss rate obtained through collection to the first packet, and then forwards the first packet to the tail node. The tail node receives the first packet, collects a delay and/or a packet loss rate of the path identified by the target segment list, adds the delay and/or packet loss rate obtained through collection to the first packet, and sends the first packet to the head node. The head node receives the first packet, and calculates a delay average value based on the delays in the received first packet, and/or calculates a packet loss rate average value based on the packet loss rates in the received first packet, to obtain an OAM result.

When the OAM manner is the out-band OAM manner, and the OAM configuration information includes the OAM frequency, in this step, the OAM is performed on the path identified by the target segment list based on the OAM frequency. In other words, the head node generates the first packet based on the OAM frequency, and sends the first packet to the tail node through the path identified by the target segment list.

When the OAM manner is the in-band OAM manner, the OAM configuration information may include the OAM granularity, and the OAM granularity is used to indicate a granularity at which the tail node sends the OAM result. The OAM granularity can be on a per-service-flow basis or a per-packet basis. On a per-service-flow basis means that when completing receiving second packets in a service flow, the tail node sends an OAM data packet to the controller, where the OAM data packet include an OAM result, and the OAM result is obtained based on the received second packets. On a per-packet basis means that when receiving a second packet in a service flow, the tail node sends an OAM data packet to the controller, where the OAM data packet includes an OAM result, and the OAM result is obtained based on the second packet.

Optionally, when perceiving, based on the OAM result, that performance of the first path cannot meet the performance requirement information defined in the SR Policy, the controller or the head node may adjust the first path. For example, when the first path is the target candidate path, a priority of the target candidate path is adjusted; when the first path is the target segment list, a weight of the target segment list is adjusted.

In this embodiment of this disclosure, the head node receives the policy configuration packet, where the policy configuration packet includes the OAM configuration information and the information about the first path, and the information about the first path is used to identify the first path. In this way, the head node may perform the OAM on the first path based on the OAM configuration information included in the policy configuration packet. In this way, when the OAM is performed on the first path, there is no need to determine all service flows transmitted on the first path and configure identification information of each service flow on the head node, so that difficulty of performing the OAM on the first path is reduced, and efficiency of performing the OAM on the first path is improved. The performance of the first path may be obtained by performing the OAM on the first path, so that when the performance of the first path changes, the change can also be perceived in time. When performing the OAM on the first path, the head node obtains the OAM data packet, and sends the OAM data packet to the controller. In this way, the controller can also perceive the change in the performance of the first path based on the OAM data packet. When perceiving that the performance of the first path cannot meet the performance requirement information defined in the SR Policy, the controller or the head node may adjust the first path. For example, when the first path is the target candidate path, the priority of the target candidate path is adjusted; when the first path is the target segment list, the weight of the target segment list is adjusted.

Refer to FIG. 16. An embodiment of this disclosure provides an apparatus 300 for sending a packet to perform OAM. The apparatus 300 may be deployed on the controller in any one of the foregoing embodiments, for example, may be deployed on the controller in the embodiment shown in FIG. 3. The apparatus 300 includes: a processing unit 301, configured to generate a policy configuration packet, where the policy configuration packet includes OAM configuration information and information about a first path, and the information about the first path is used to identify the first path; and a sending unit 302, configured to send the policy configuration packet to a head node of the first path, where the policy configuration packet is used to indicate the head node to perform OAM on the first path based on the OAM configuration information.

Optionally, for a detailed implementation process in which the processing unit 301 generates the policy configu-ration packet, refer to related content of generating the policy configuration packet by the controller in step 101 in the embodiment shown in FIG. 3.

Optionally, the policy configuration packet is an SR Policy configuration packet, the SR Policy configuration packet includes information about a candidate path, the candidate path includes a segment list, and the first path is the candidate path or a path identified by the segment list.

Optionally, for a structure of the SR Policy configuration packet, refer to related content of the SR Policy configura-tion packet in step 301 in the embodiment shown in FIG. 3.

Optionally, when the first path is the candidate path, the SR Policy configuration packet further includes identifica-tion information, and the identification information is used to indicate the head node to perform the OAM on the candidate path based on the OAM configuration information when the candidate path is an active path.

Optionally, the apparatus 300 further includes: a receiving unit 303, configured to receive an OAM data packet, where the OAM data packet is obtained by performing the OAM on the first path.

Optionally, the policy configuration packet is a BGP packet or a PCEP packet.

Optionally, the OAM configuration information includes at least one of an OAM manner, an OAM object, an OAM granularity, or an OAM frequency.

Optionally, the OAM manner includes at least one of the following manners: IOAM, IPFPM, iFIT, TWAMP, OWAMP, and PING.

In this embodiment of this disclosure, the processing unit generates the policy configuration packet, where the policy configuration packet includes the OAM configuration infor-mation and the information about the first path, and the information about the first path is used to identify the first path. The sending unit sends the policy configuration packet to the head node of the first path, and the policy configu-ration packet is used to indicate the head node to perform the OAM on the first path based on the OAM configuration information. In this way, when the OAM is performed on the first path, there is no need to determine all service flows transmitted on the first path and configure identification information of each service flow on the head node, so that difficulty of performing the OAM on the first path is reduced, and efficiency of performing the OAM on the first path is improved.

Figure 17:
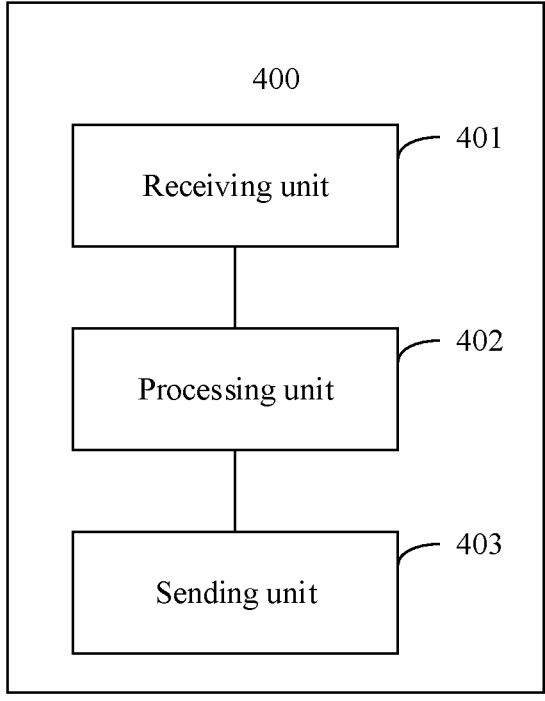
FIG. 17 is a schematic diagram of a structure of an apparatus for receiving a packet to perform OAM according to an embodiment of this disclosure.

Refer to FIG. 17. An embodiment of this disclosure provides an apparatus 400 for receiving a packet to perform OAM. The apparatus 400 may be deployed on the head node in any one of the foregoing embodiments, for example, may be deployed on the head node in the embodiment shown in FIG. 15. The apparatus 400 includes: a receiving unit 401, configured to receive a policy configuration packet, where the policy configuration packet includes OAM configuration information and information about a first path, and the information about the first path is used to identify the first path; and a processing unit 402, configured to perform OAM on the first path based on the OAM configuration informa-tion.

Optionally, for a detailed implementation process in which the processing unit 402 performs the OAM on the first path, refer to related content of performing the OAM on the first path by the head node in step 202 in the embodiment shown in FIG. 15.

Optionally, the policy configuration packet is an SR Policy configuration packet, the SR Policy configuration packet includes information about a candidate path, the candidate path includes a segment list, and the first path is the candidate path or a path identified by the segment list.

Optionally, the apparatus 400 further includes a sending unit 403, where the processing unit 402 is configured to obtain OAM execution information based on the OAM configuration information; the receiving unit 401 is further configured to receive a first packet; the processing unit 402 is further configured to add the OAM execution information to the first packet to generate a second packet; and the sending unit 403 is configured to send the second packet through the first path.

Optionally, for a detailed implementation process in which the processing unit 402 obtains OAM information and generates the second packet, refer to related content of step 202 in the embodiment shown in FIG. 15 in which the head node obtains the OAM information and generates the second packet.

Optionally, the processing unit 402 is configured to gen-erate the first packet based on the OAM configuration information, where the first packet includes the OAM execu-tion information.

The sending unit 403 is configured to send the first packet through the first path.

Optionally, for a detailed implementation process in which the processing unit 402 obtains and generates the first packet, refer to related content of generating the first packet by the head node in step 202 in the embodiment shown in FIG. 15.

Optionally, when the first path is the candidate path, the processing unit 402 is configured to obtain identification information, and the identification information is used to indicate the processing unit 402 to perform the OAM on the candidate path based on the OAM configuration information when the candidate path is an active path.

Optionally, the processing unit 402 is further configured to perform the OAM on the first path, to obtain an OAM data packet.

The sending unit 403 is configured to send the OAM data packet to a controller.

Optionally, the policy configuration packet is a BGP packet or a PCEP packet.

In this embodiment of this disclosure, the receiving unit receives the policy configuration packet, where the policy configuration packet includes the OAM configuration infor-mation and the information about the first path, and the information about the first path is used to identify the first path. The processing unit performs the OAM on the first path based on the OAM configuration information. In this way, when the OAM is performed on the first path, there is no need to determine all service flows transmitted on the first path and configure identification information of each service flow on the apparatus, so that difficulty of performing the OAM on the first path is reduced, and efficiency of performing the OAM on the first path is improved.

Figure 18:
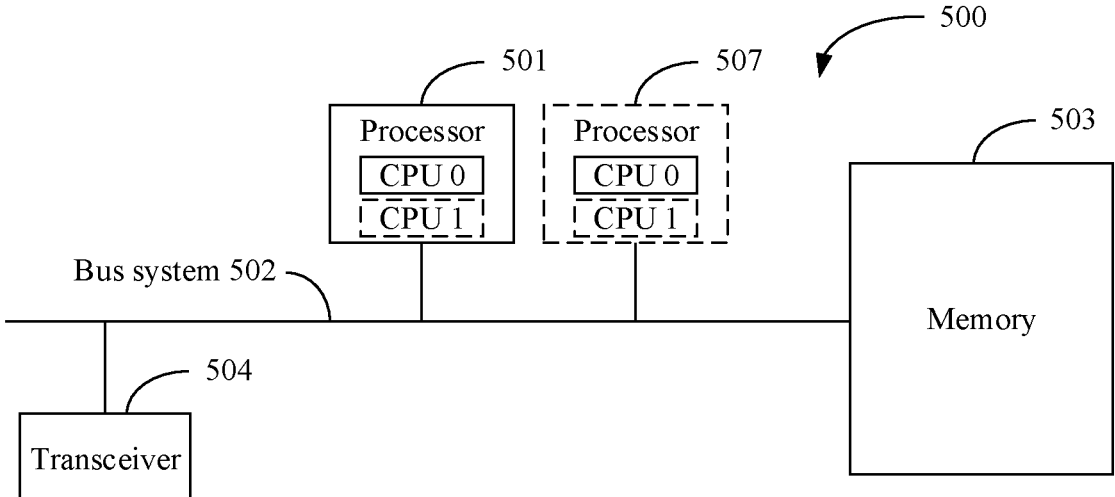
FIG. 18 is a schematic diagram of a structure of another apparatus for sending a packet to perform OAM according to an embodiment of this disclosure.

FIG. 18 is a schematic diagram of an apparatus 500 for sending a packet to perform OAM according to an embodiment of this disclosure. The apparatus 500 may be the controller in any one of the foregoing embodiments, for example, may be the controller in the embodiment shown in FIG. 3. The apparatus 500 includes at least one processor 501, a bus system 502, a memory 503, and at least one transceiver 504.

The apparatus 500 is an apparatus of a hardware structure, and can be configured to implement the function modules in the apparatus 300 shown in FIG. 16. For example, a person skilled in the art may figure out that the processing unit 301 in the apparatus 300 shown in FIG. 16 may be implemented by the at least one processor 501 by invoking code in the memory 503, and the sending unit 302 and the receiving unit 303 in the apparatus 300 shown in FIG. 16 may be implemented by the transceiver 504.

Optionally, the apparatus 500 may further be configured to implement a function of the collection analysis device in any one of the foregoing embodiments.

Optionally, the processor 501 may be a general-purpose central processing unit (CPU), a network processor (NP), a microprocessor, an application-specific integrated circuit (ASIC), or one or more integrated circuits configured to control program execution of the solutions of this disclosure.

The bus system 502 may include a path for transmitting information between the foregoing components.

The transceiver 504 is configured to communicate with another device or a communication network.

The memory 503 may be a read-only memory (ROM) or another type of static storage device that can store static information and instructions, a random-access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a BLU-RAY disc, or the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor through a bus. The memory may alternatively be integrated with the processor.

The memory 503 is configured to store application program code for executing the solutions in this disclosure, and the processor 501 controls the execution. The processor 501 is configured to execute the application program code stored in the memory 503, to implement functions in the method in this patent.

In a specific implementation, in an embodiment, the processor 501 may include one or more CPUs, for example, a CPU 0 and a CPU 1 in FIG. 16.

In a specific implementation, in an embodiment, the apparatus 500 may include a plurality of processors, for example, the processor 501 and a processor 507 shown in FIG. 16. Each of the processors may be a single-CPU (single-CPU) processor, or may be a multi-CPU processor. The processor herein may be one or more devices, circuits, and/or processing cores configured to process data (for example, computer program instructions).

Figure 19:
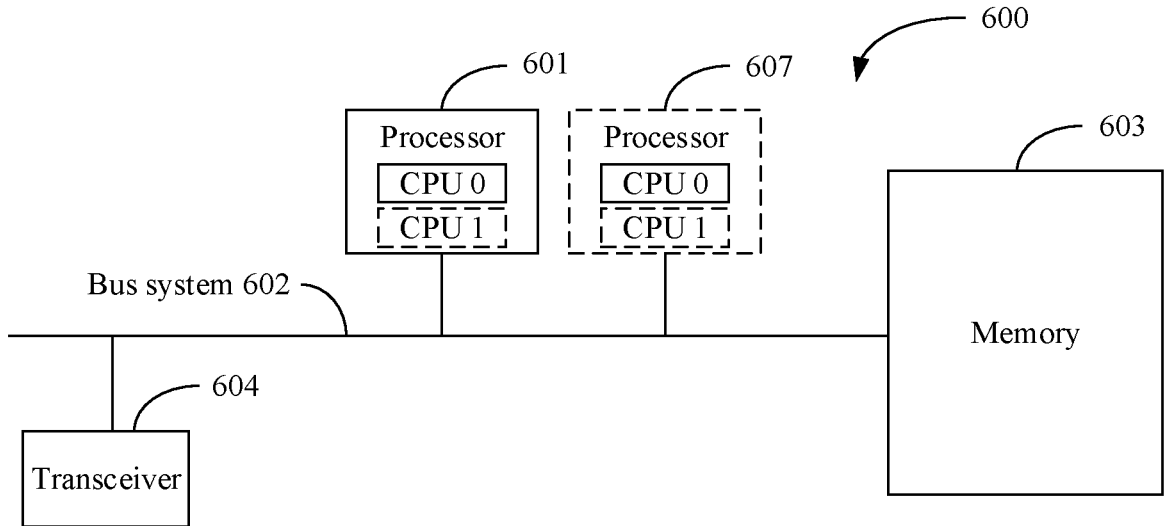
FIG. 19 is a schematic diagram of a structure of an apparatus for receiving a packet to perform OAM according to an embodiment of this disclosure.

FIG. 19 is a schematic diagram of an apparatus 600 for receiving a packet to perform OAM according to an embodiment of this disclosure. The apparatus 600 may be the head node in any one of the foregoing embodiments, for example, may be the head node in the embodiment shown in FIG. 15. The apparatus 600 includes at least one processor 601, a bus system 602, a memory 603, and at least one transceiver 604.

The apparatus 600 is an apparatus of a hardware structure, and can be configured to implement the function modules in the apparatus 400 shown in FIG. 17. For example, a person skilled in the art may figure out that the processing unit 402 in the apparatus 400 shown in FIG. 17 may be implemented by the at least one processor 601 by invoking code in the memory 603, and the receiving unit 401 and the sending unit 403 in the apparatus 400 shown in FIG. 17 may be implemented by the transceiver 604.

Optionally, the apparatus 600 may further be configured to implement a function of the collection analysis device in any one of the foregoing embodiments.

Optionally, the processor 601 may be a general-purpose CPU, an NP, a microprocessor, an application-specific integrated circuit (ASIC), or one or more integrated circuits configured to control program execution of the solutions of this disclosure.

The bus system 602 may include a path for transmitting information between the foregoing components.

The transceiver 604 is configured to communicate with another device or a communication network.

The memory 603 may be a ROM or another type of static storage device that can store static information and instructions, a RAM or another type of dynamic storage device that can store information and instructions, or may be an EEPROM, a compact disc read-only memory (CD-ROM) or another optical disc storage, an optical disc storage (including a compressed optical disc, a laser disc, an optical disc, a digital versatile disc, a BLU-RAY disc, or the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor through a bus. The memory may alternatively be integrated with the processor.

The memory 603 is configured to store application program code for executing the solutions in this disclosure, and the processor 601 controls the execution. The processor 601 is configured to execute the application program code stored in the memory 603, to implement functions in the method in this patent.

In a specific implementation, in an embodiment, the processor 601 may include one or more CPUs, for example, a CPU 0 and a CPU 1 in FIG. 19.

In a specific implementation, in an embodiment, the apparatus 600 may include a plurality of processors, for example, the processor 601 and a processor 607 shown in FIG. 19. Each of the processors may be a single-CPU (single-CPU) processor, or may be a multi-CPU processor. The processor herein may be one or more devices, circuits, and/or processing cores configured to process data (for example, computer program instructions).

Figure 20:
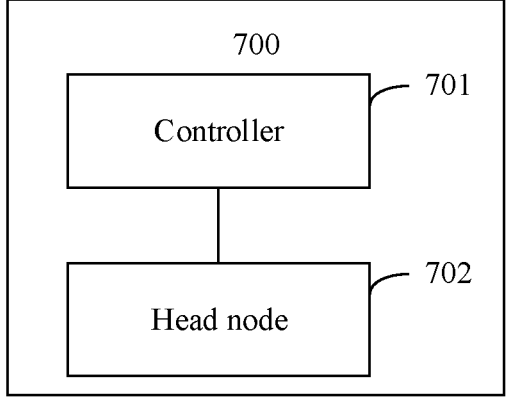
FIG. 20 is a schematic diagram of a structure of a system for receiving a packet to perform OAM according to an embodiment of this disclosure.

Refer to FIG. 20. An embodiment of this disclosure provides a system 700 for receiving a packet to perform the OAM. The system 700 includes the apparatus 300 shown in FIG. 16 and the apparatus 400 shown in FIG. 17, or the system 700 includes the apparatus 500 shown in FIG. 18 and the apparatus 600 shown in FIG. 19.

Optionally, refer to FIG. 20. The apparatus 300 in FIG. 16 or the apparatus 500 in FIG. 18 may be a controller 701, and the apparatus 400 in FIG. 17 or the apparatus 600 in FIG. 19 may be a head node 702. For example, the apparatus 300 in FIG. 16 or the apparatus 500 in FIG. 18 may be the controller in the embodiment shown in FIG. 3, and the apparatus 400 in FIG. 17 or the apparatus 600 in FIG. 19 may be the head node in the embodiment shown in FIG. 15.

Optionally, the system 700 may further include another network device such as a tail node.

The foregoing descriptions are merely optional embodiments of this disclosure, but are not intended to limit this disclosure. Any modification, equivalent replacement, or improvement made without departing from the principle of this disclosure should fall within the protection scope of this disclosure.

What is claimed is:

1. A controller comprising:
one or more memories configured to store programming instructions; and
at least one processor coupled to the one or more memories and configured to execute the programming instructions to cause the controller to:
generate a segment routing (SR) policy configuration packet, wherein the SR policy configuration packet comprises in-situ flow information telemetry (iFIT) configuration information, first information about a candidate path, and identification information, wherein the candidate path comprises a plurality of segments, and wherein the identification information instructs a head node of the candidate path to perform, based on the iFIT configuration information, iFIT on the candidate path comprising the plurality of segments when the candidate path is an active path; and
send the SR policy configuration packet to the head node.

2. The controller of claim 1, wherein the candidate path comprises a segment list identifying the plurality of segments.

3. The controller of claim 1, wherein the at least one processor is further configured to execute the programming instructions to cause the controller to receive an iFIT data packet, and wherein the iFIT data packet is based on performing the iFIT on the candidate path.

4. The controller of claim 1, wherein the SR policy configuration packet is a Border Gateway Protocol (BGP) packet or a Path Computation Element Communication Protocol (PCEP) packet.

5. The controller of claim 1, wherein the iFIT configuration information comprises an iFIT manner, an iFIT object, an iFIT granularity, or an iFIT frequency.

6. The controller of claim 1, wherein the plurality of segments identifies a path between the head node and a tail node.

7. The controller of claim 6, wherein each of the plurality of segments corresponds to at least one sub-type length value (TLV).

8. The controller of claim 7, wherein the at least one sub-TLV indicates an in-situ operations, administration and maintenance (IOAM) pre-allocated trace option sub-TLV.

9. The controller of claim 7, wherein the at least one sub-TLV indicates an in-situ operations, administration and maintenance (IOAM) incremental trace option sub-TLV.

10. The controller of claim 7, wherein the at least one sub-TLV indicates an in-situ operations, administration and maintenance (IOAM) edge-to-edge option sub-TLV.

11. A network device comprising:
one or more memories configured to store programming instructions; and at least one processor coupled to the one or more memories and configured to execute the programming instructions to cause the network device to:
receive a segment routing (SR) policy configuration packet, wherein the SR policy configuration packet comprises in-situ flow information telemetry (iFIT) configuration information, first information about a candidate path, and identification information, wherein the candidate path comprises a plurality of segments, and wherein the identification information instructs a head node of the candidate path to perform, based on the iFIT configuration information, iFIT on the candidate path comprising the plurality of segments when the candidate path is an active path; and
perform, based on the iFIT configuration information, iFIT on the candidate path comprising the plurality of segments when the candidate path is the active path.

12. The network device of claim 11, wherein the candidate path comprises a segment list identifying the plurality of segments.

13. The network device of claim 11, wherein the at least one processor is further configured to execute the programming instructions to cause the network device to:
obtain, based on the iFIT configuration information, iFIT execution information;
receive a first packet;
add the iFIT execution information to the first packet to obtain a second packet; and
send the second packet through the candidate path.

14. The network device of claim 11, wherein the at least one processor is further configured to execute the programming instructions to cause the network device to:
generate, based on the iFIT configuration information, a first packet, wherein the first packet comprises iFIT execution information; and
send the first packet through the candidate path.

15. The network device of claim 11, wherein the at least one processor is further configured to execute the programming instructions to cause the network device to:
perform the iFIT on the candidate path to obtain an iFIT data packet; and
send the iFIT data packet to a controller.

16. The network device of claim 11, wherein the SR policy configuration packet is a Border Gateway Protocol (BGP) packet or a Path Computation Element Communication Protocol (PCEP) packet.

17. A system comprising:
a controller configured to:
generate a segment routing (SR) policy configuration packet, wherein the SR policy configuration packet comprises in-situ flow information telemetry (iFIT) configuration information, first information about a candidate path, and identification information, wherein the candidate path comprises a plurality of segments, and wherein the identification information instructs a head node of the candidate path to perform, based on the iFIT configuration information, iFIT on the candidate path comprising the plurality of segments when the candidate path is an active path; and
send the SR policy configuration packet to the head node of the candidate path; and
the head node configured to:
receive the SR policy configuration packet; and perform, based on the iFIT configuration information, iFIT on the candidate path comprising the plurality of segments when the candidate path is the active path.

18. The system of claim 17, wherein the candidate path comprises a segment list identifying the plurality of segments.

19. The system of claim 17, wherein the SR policy configuration packet is a Border Gateway Protocol (BGP) packet or is a Path Computation Element Communication Protocol (PCEP) packet.

20. The system of claim 17, wherein the iFIT configuration information comprises an iFIT manner, an iFIT object, an iFIT granularity, or an iFIT frequency.

* * * * *